United States Patent [19]

Riedel

[11] 4,234,027
[45] Nov. 18, 1980

[54] TIRE-CHAIN ASSEMBLY

[75] Inventor: Tilo Riedel, Eching, Fed. Rep. of Germany

[73] Assignee: Sesamat Anstalt, Chiasso, Switzerland

[21] Appl. No.: 971,373

[22] Filed: Dec. 20, 1978

Related U.S. Application Data

[63] Continuation-in-part of Ser. No. 748,547, Dec. 8, 1976, Pat. No. 4,146,075.

[30] Foreign Application Priority Data

Dec. 12, 1975 [DE] Fed. Rep. of Germany ....... 2556115
May 17, 1976 [DE] Fed. Rep. of Germany ....... 2611273
Nov. 5, 1976 [DE] Fed. Rep. of Germany ....... 2650703

[51] Int. Cl.³ .......................................... B60C 27/06
[52] U.S. Cl. ................................ 152/213 R; 152/221; 152/225 R; 152/239; 152/241
[58] Field of Search ....... 152/213 R, 213 A, 217–219, 152/221, 225, 231–233, 241, 242, 239

[56] References Cited

U.S. PATENT DOCUMENTS

| | | | |
|---|---|---|---|
| 1,625,593 | 4/1927 | Cross | 152/219 |
| 1,935,035 | 11/1933 | Levi | 152/213 A |
| 2,006,659 | 7/1935 | Stuller | 152/233 |
| 2,275,994 | 3/1942 | Ruhkala | 152/213 R |
| 2,562,798 | 7/1951 | Kovatch et al. | 152/213 A |
| 2,976,902 | 3/1961 | Pierre | 152/217 |
| 3,044,521 | 7/1962 | Pierre | 152/241 |
| 3,752,204 | 8/1973 | Ouellette | 152/213 A |
| 3,884,283 | 5/1975 | Engel | 152/213 A |
| 3,893,499 | 7/1975 | Von der Hellen | 152/213 A |

Primary Examiner—John E. Kittle
Attorney, Agent, or Firm—Michael J. Striker

[57] ABSTRACT

A tire-chain assembly for a vehicle-mounted wheel basically comprises annular inner and outer holders respectively engaging the inner and outer faces of the wheel. At least one traction chain crisscrosses over the road-engaging surface of the wheel between the two holders. The inner holder is provided with a flexible element that tightens the chain on the road-engaging surface. The outer end of the flexible element, which may be a chain, a rope or the like, is then secured to the holder on one of the surfaces of the wheel. There is provided a tightening mechanism so as to ensure self-locking of the tire-chain assembly on the wheel.

22 Claims, 15 Drawing Figures

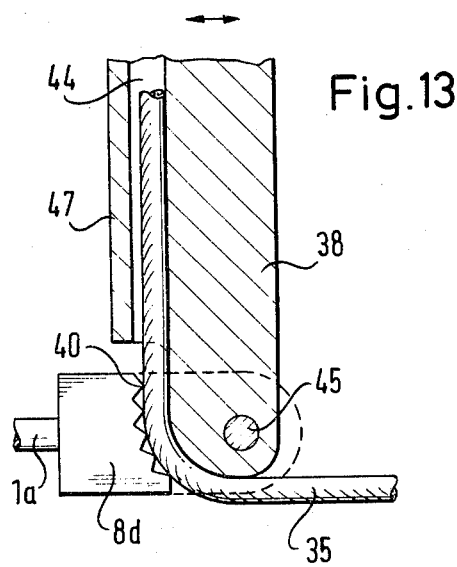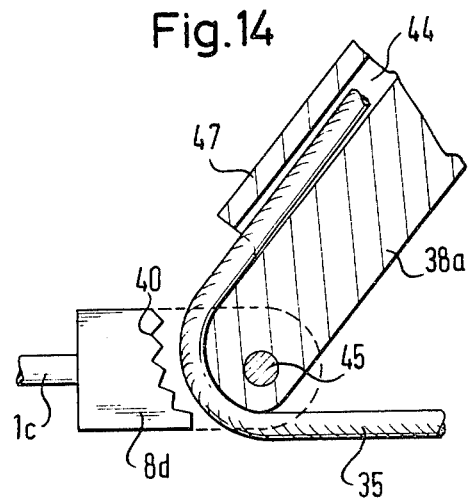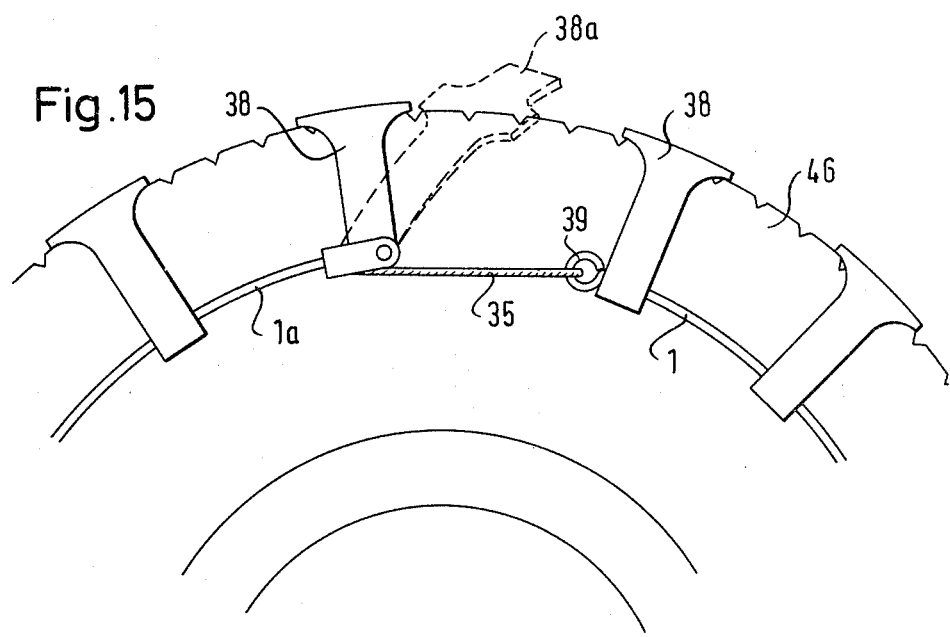

TIRE-CHAIN ASSEMBLY

CROSS REFERENCE TO RELATED APPLICATIONS

This application is a continuation-in-part of the copending parent application Ser. No. 748,547, filed Dec. 8, 1976 of Tilo Riedel, for "Easy-Mount Tire-Chain Assembly," now U.S. Pat. No. 4,146,075.

BACKGROUND OF THE INVENTION

The present invention relates to a tire-chain assembly. More particularly this invention concerns a tire chain assembly adapted to be mounted on a ground engaging wheel of a motor vehicle.

It is known in the prior art to provide the wheels of a vehicle with so-called snow tires for maximum traction under snowy or icy conditions. Mounting and subsequent clamping of the tire chains are extremely onerous tasks, almost invariably complicated by the fact that it is done under snowy and cold conditions.

Various tire-chain assemblies with different clamping arrangements have been designed which were intended to simplify the mounting operation. No such clamping arrangement has ever in practice proven itself by being relatively easy to secure the tire-chain assembly on the wheel, yet at the same time of low cost and long service life.

SUMMARY OF THE INVENTION

It is a general object of the present invention to avoid the disadvantages of the prior art tire-chain assemblies.

More particularly, it is an object of the present invention to provide an improved tire-chain assembly which can radially and quickly secure the tire-chain assembly on the wheel.

Another object is to provide an inexpensive and yet reliable clamping member which can be operated from the outer (i.e. external) side of the wheel to simultaneously secure the inner holder (i.e. internal) of the tire-chain assembly.

Yet another object is to provide such an arrangement which is very easy in operation (that is locking and unlocking) from the outer side of the wheel.

In pursuance of these objects and others which will become apparent hereafter, one feature of the present invention resides in providing an outer holder on the outer face of the wheel, an inner holder on the inner face of the wheel, at least one traction chain extending back and forth between the holders above the ground engaging surface of the wheel.

There are further provided tightening means connected to the inner holder and including a flexible substantially nonextensible element for tightening the chain on the ground-engaging surface. The flexible element has one end for pulling by a user and another end. At least the inner holder is provided with means for securing said flexible element so as to arrest said tightening means and including first means mounting said other end of the flexible element for eliminating any longitudinal displacement of said other end relative to the first means when the flexible element is tightened, and second means fixedly located relative to said first means and operative for arresting said one end of said flexible element when the same is tightened.

Such an arrangement advantageously ensures that the flexible element can be secured even on the inner holder. It is also to be noticed that unlocking of the flexible element can be carried out simply by pulling the same relative to the corresponding holder.

In accordance with one embodiment of the present invention the flexible element may be double-arrested in order to guarantee reliable positioning of the flexible element when the same is tightened.

Thus, the second means include a housing which in accordance with one embodiment of the present invention is provided with a slot guide. The slot guide is so dimensioned as to permit the flexible element (i.e. chain) to pass therethrough only when the corresponding chain element which is in the slot guide is arranged transversely relative to the elongation of the slot. In other words, if the corresponding chain element is arranged lengthwisely with respect to the elongation of the slot then this element will not pass through the slot guide because the latter has too small a longitudinal dimension. It is to be understood that the form of the slot guide may have a lot of different modifications. For example, the slot guide may be arranged between two elongated bars extending parallel to each other and spaced from each other by a distance which defines the transverse dimension of the slot guide. Obviously, such a slot guide may be arranged between two bars, plates, sheet strips, flat bars, round bars, rollers, etc.

It is also to be mentioned that the cross-section of the corresponding slot guide may vary along the elongation of the slot guide. For example, the end portions of the slot guide can be made narrower (but still wide enough to let the chain element come through) than the middle portion of the slot guide. This can be done, in order to reduce possibility of an undesired inadvertent slipping of the corresponding chain element through the slot guide, which otherwise can cause a premature unlocking of the tire-chain assembly. On the whole, by pivoting the corresponding chain element from the respective lengthwise position with respect to the slot guide into the respective transverse wire position one can reliably stop passage of the chain through the slot guide in either direction, that is in direction so as to tighten the holders on the wheel and vice versa.

Another advantageous feature of the present invention resides in providing relative partial rotation between the housing and said other end of the flexible element (i.e. chain). In order to accomplish this, the housing is provided, in accordance with another embodiment of the present invention, with an additional portion which pivotably receives the other end of the chain. In accordance with one embodiment of the present invention this other end is provided with a bent portion (for example at an angle of 90°), which serves as an end stop during pivoting of the chain.

The bent portion abuts the corresponding additional portion of the housing when the chain pivots, thus preventing any further pivoting of the chain. It is possible to arrange practically any desired angular displacement of the chain. Provision of such an angular displacement is essential to render it possible to change the position of each of the chain elements relative to the slot guide, so as, for example, to let the chain element through the slot guide or to stop any movement of the chain relative to the slot guide. It is to be understood that the required angle of pivoting of the chain element is so selected as to eliminate any multiple rotation of the chain, to thereby preclude any tangling between the chain elements of the same chain.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 13 and 14 are side views of another embodiment of the rope clamping arrangement shown in FIGS. 11 and 12; and FIG. 15 is a side view of the rope clamping arrangement in assembly with a wheel.

DESCRIPTION OF PREFERRED EMBODIMENTS

The overall arrangement of a tire-chain assembly is similar to that shown in FIGS. 1-4 presented in the copending parent application Ser. No. 748,547, filed Dec. 8, 1976 of Tilo Riedel now U.S. Pat. No. 4,146,075, for "Easy-Mount Tire-Chain Assembly."

Figure 1:
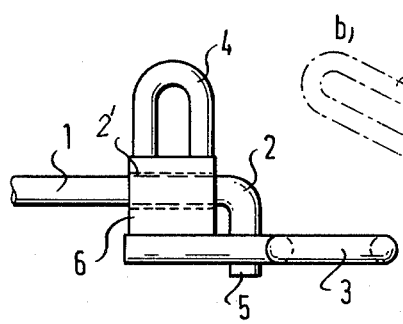
FIG. 1 is a side view of a clamping arrangement of a tire-chain assembly in accordance with the present invention.

Referring now to the drawings of the present invention and first to FIG. 1 thereof, it may be seen that the reference numeral 6 designates a housing mounted on an inner holder of the tire chain assembly. A portion 1 of a pulling flexible element is inserted in the housing 6 (i.e. through a hole 2') and extends therefrom with a bent portion 2. The bent portion 2 is capable of angular displacement relative to the housing 6 by an angle, which in this embodiment is equal to substantially 340°. The housing 6 is provided with an eyelet 4 for inserting therein a traction chain (not shown) which extends back and forth between the holders over a ground engaging surface of a wheel (see FIGS. 1-4 of the parent application). Thus, the eyelet 4 is also pivotable relative to the chain portion 1. It is to be understood that such an arrangement may be provided on both inner and outer holders of the tire-chain assembly (see FIGS. 1-4 of the parent application). The housing 6 may be made for example of circular, squared or any other profiled material. The lower portion of the housing 6 is provided with an eyelet 3 for receiving the corresponding end portion of the flexible pulling element (i.e. chain).

Figure 3:
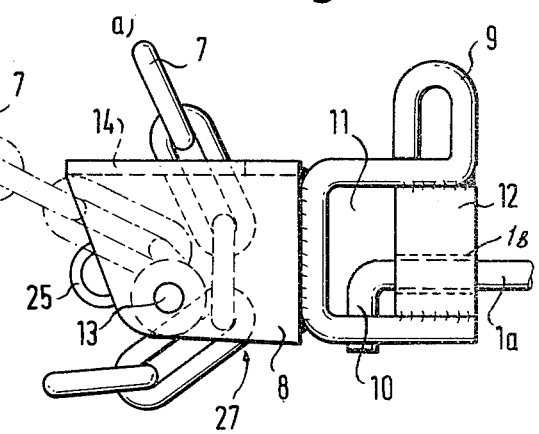
FIG. 3 is a side view of another embodiment of the clamping arrangement of the tire-chain assembly.
Figure 2:
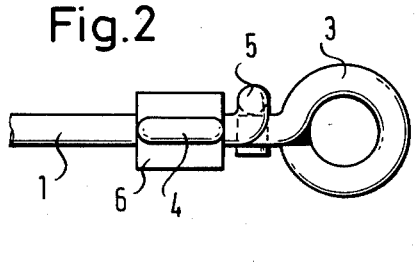
FIG. 2 is a top view of the arrangement shown in FIG. 1.
Figure 4:
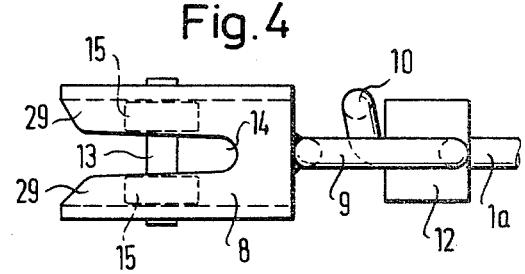
FIG. 4 is a top view of the embodiment shown in FIG. 3.
Figure 5:
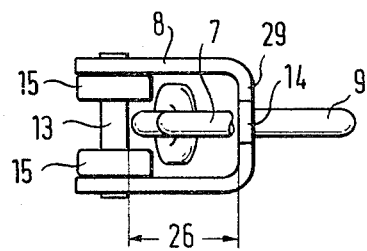
FIG. 5 is a top view of a third embodiment of the present invention.

FIGS. 3-5 show a housing 8, which receives the pulling chain 7. The housing 8 has a throughgoing slot guide 14, which has a lower inlet 27. The inlet 27, and the interior of the slot guide 14 are so dimensioned that the pulling chain when inside the slot guide 14 cannot rotate. An axle 13 with two end members 15 is mounted on the housing 8. The pulling chain 7 can come through the slot guide 14 only as shown in FIG. 5. The distance 26 is so chosen as to allow the chain element to pass through the slot guide 14 only when the former is arranged transversely relative to the slot guide 14 that is when the chain element extends substantially parallel to the elongation of the axle 13. If the chain element is arranged substantially transversely to the axle 13, then the chain 7 will not run through the slot guide 14 until a user turns this chain element into its parallel position relative to the axle 13. The housing 8 is provided with a bent portion 9 which has an additional guide passage 16 for the corresponding end portion of the chain. It is also possible to replace the axle 13 with rollers or any other similar elements for the same purpose. Obviously, the axle 13 can be provided with rollers as the end members 15. The slot guide 14 is better shown in FIG. 4. The chain element arranged transversely to the axle 13 cannot pass through the slot guide 14, whereas the chain element arranged substantially parallel to the axle 13 passes through the slot guide 14 without any delay. Should the chain element be arranged above the upper surface of the housing 8 in position a) (see FIG. 3) then the backward movement of the chain (i.e. toward the unlocking position of the tire-chain assembly) is precluded. Should the chain 7 be arranged in position b) then for example, the backward movement of the chain is possible, that is the chain 7 can pass through the slot guide 14 either up or down.

It is to be understood that instead of the rear side 29 one can use one or two bars or the like, so that the overall shape of the housing 8 may be quite different. In any case, the housing 8 may be provided with a support 12 operative for receiving the corresponding end portion 1a of the pulling chain. The end portion 1a has a bent portion 10 which is capable of pivoting by an angle approximately 340°. Obviously, it is possible to arrange for considerably smaller angular displacement of the portion 10. The housing 8 is further provided with an eyelet 9 for receiving therein the corresponding end of the traction chain (see the FIGS. 1-4 of the parent application).

Figure 6:
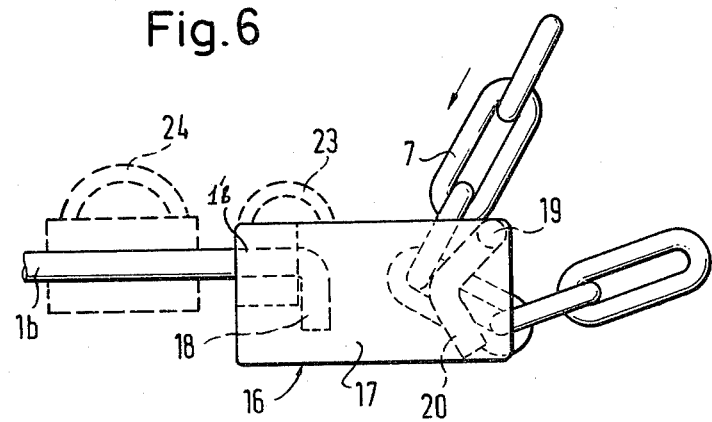
FIG. 6 is a side view of a fourth embodiment of the present invention.
Figure 7:
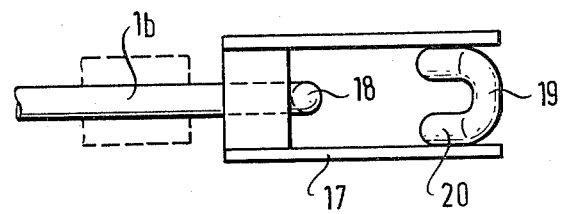
FIG. 7 is a top view of the embodiment shown in FIG. 6.
Figure 8:
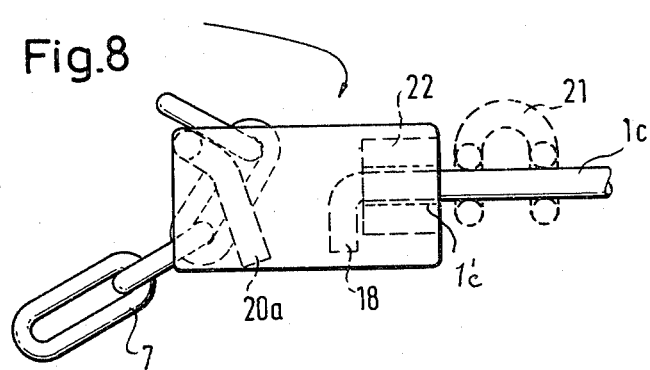
FIG. 8 is a side view of a fifth embodiment of the present invention.

FIGS. 6-8 show a housing 16 which can be adjusted to the outer holder (see FIGS. 1-4 of the parent application). In this case the housing 16 is provided with a corresponding guide passage 1b' and 1c' for receiving the corresponding end portions 1b and 1c, respectively, of the pulling chain. The end portion 1b (or 1c) is provided with a bent portion 18. The opposite side of the housing 16 is provided with a bracket 19 having a fork 20 and operative for arresting the chain on the outer side of the wheel to be tire-chained. It is to be understood that the fork 20 may have very different forms. For example, FIG. 8 illustrates another embodiment of the angular member; that is a fork 20a. FIG. 8 shows a support 22 for the bent portion 18. Besides, there is provided the eyelet 21 for the traction chain (similar to the eyelets 23 or 24 shown in FIG. 6).

The fork 20 is so shaped that the transversely oriented chain element of the chain 7 will not pass through the guide passage of the fork. Instead of the forks 20, 20a there can be used similar means, for example clamping bars of corresponding form, slotted plates, etc.

It is to be understood that all elements described hereabove may be applied to both outer and inner holders of the tire-chain assembly.

Figure 9:
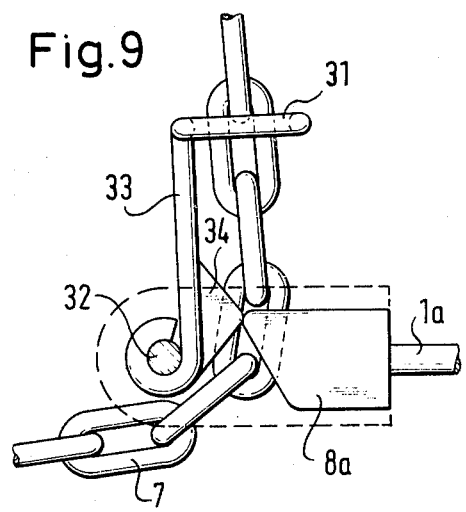
FIGS. 9 and 10 are side views of a sixth embodiment of the present invention.
Figure 10:
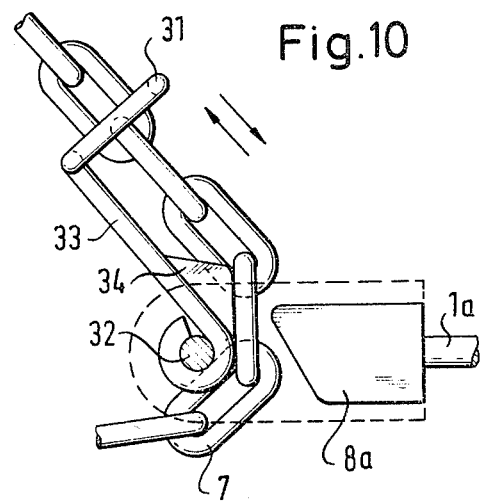

FIG. 9 shows still another embodiment of the present invention. The pulling chain is lead through the housing 8a. The housing 8a has a throughgoing passage for receiving therethrough the chain. There is provided an arm 33 pivotably mounted on axis 32. The other end of the arm 33 is provided with an eyelet 31. The throughgoing passage in the housing 8a is so shaped and dimensioned as to permit the chain to pass through this passage when the corresponding chain element is arranged longitudinally, and to prevent when the chain element is arranged transversely with respect to the passage. The arm 33 is provided with an extension 34 which closes the passage when the arm 33 is in a position shown in FIG. 9. In such a position the extension 34 additionally prevents any movement of the chain 7 relative to the housing 8a. When the arm 33 is in an inclined position (see FIG. 10) the chain 7 may be displaced through the passage in either of the shown directions (see two oppositely directed arrows).

There can be used, instead of the slot guide, a clamping jaw arrangement. Such clamping jaw arrangement is known as a curry-clamping device. It is advantageous to employ the currey-clamping device for clamping pulling ropes, wires, cables and the like. The elements to be clamped may be metallic or non-metallic.

Figure 11:
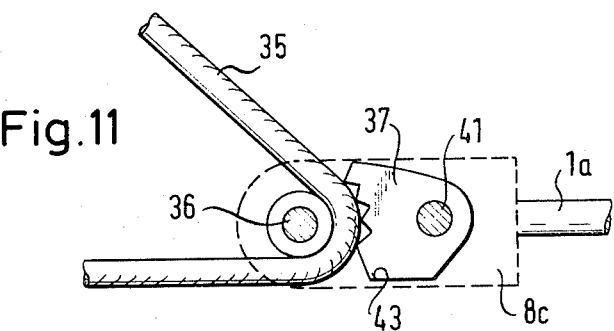
FIG. 11 is a side view of the clamping arrangement in a clamped position, with a rope as a flexible element.
Figure 12:
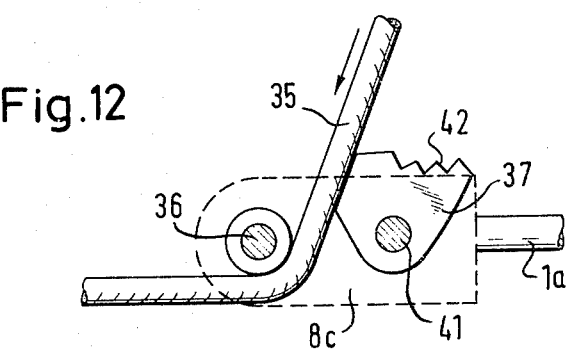
FIG. 12 is a side view of the clamping arrangement shown in FIG. 11, in an unclamped position.

FIGS. 11 and 12 show such a curry-clamping device, which includes a spring-loaded clamping jaw 37, which is pivotable about an axis 41. The spring may be mounted inside the clamping jaw 37, or the spring may be so arranged as to superimpose the clamping jaw 37. In any case the clamping jaw 37 is so urged by the spring as to pivot to a clamping position, that is the position shown in FIG. 11. In such a position the clamping jaw 37 engages the rope 35 and urges the same against a roller 36 to thereby clamp the rope 35, that is to achieve the desired clamping effect. The roller 36 may also be also provided with a clamping jaw directed opposite the clamping jaw 37. Obviously, such an arrangement clamps the rope 35 much more reliably than the arrangement with one clamping jaw. The clamping jaw 37 and the roller 36 are installed in a housing 8c. FIG. 13 shows a position in which the rope 35 is free to move relative to the housing 8c. In such a position the clamping jaw 37 is being pivoted to the right so as to disengage the rope 35. In the position shown in FIG. 12, a surface 43 serves as a guide for movement of the rope 35.

It is to be understood, that the roller 36 may be replaced by a clamping jaw similar to the jaw 37. Should it be the case, the second clamping jaw may be installed stationarily or movably.

The rope 35 may be of filaments of synthetic plastic material. Such an arrangement may be also used for the pulling chains.

FIGS. 13 and 14 show an embodiment similar to that shown in FIGS. 11 and 12. The clamping jaw is provided on a housing 8d (see FIGS. 13 and 14). The rope 35 is guided by a cross bar 38, which is provided for this purpose with a guiding throughgoing passage 44. The crossbar 38 (or 38a in FIG. 14) is pivotable about an axis 45. A position shown in FIG. 13 corresponds to arresting the rope 35 against its movement relative to the housing 8d, whereas FIG. 14 corresponds to the situation in which the rope 35 is released for its movement relative to the housing 8d. The position of the crossbar 38a shown in FIG. 14 corresponds to that shown in FIG. 15, which is partially discloses overall arrangement of the tire-chain assembly on a vehicle wheel.

The crossbar 38 may be also provided at the lower part thereof counterfacing the clamping jaw of the housing 8d with another clamping jaw. The crossbar 38 is spring loaded, so that it pivots in the position shown in FIG. 13 without applying any additional force.

FIG. 15 shows a tire 46 provided with a number of the crossbars 38. The reference numeral 1 designates an inner holder which has an eyelet 39. The rope 35 is inserted by its one end in the eyelet 39 and the other end of the rope 35 runs to the left towards the crossbar 38. The position 38a of the crossbar of FIG. 15 corresponds to that shown in FIG. 14, whereas the position 38 of the crossbar in FIG. 15 corresponds to that shown in FIG. 13. The housing 8d is mounted on the inner holder 1. The cross bar 38 may be made of synthetic plastic material.

All other hereabove discussed elements (that is housings, rollers, etc.) may be also made for example of synthetic plastic material.

The rope can be reinforced, for example it may be provided with a plurality of balls. The rope may be of synthetic plastic material. It may be perforated or have any other similar form. In order to arrest the pulling element (chain, rope, etc.), there may be used a collet-like element. The collet is spring-loaded so as to be normally urged in the closed position. The collet has a throughgoing passage for receiving therethrough the rope or the chain only in one direction. In other words, when the collet is open the transversely oriented chain elements can pass through the collet in direction so as to tighten the holders movement of the chain in the opposite direction, that is to loosen the holders, is impossible. Thus, if one wants to loosen the holders, he has to pull the chain out of the collet.

A ratchet may also be used to arrest the pulling element (i.e. chain, rope, etc.). In this case the ratchet is mounted on the housing. The ratchet operates so as to guide the pulling element. If the ratchet is released, then the pulling element slides backwardly so as to release the holders.

On the whole the present invention teaches self-locking arresting members. Primarily, the arresting members are spring-loaded. The arresting members may be provided with roughened flanges, cams, toothing portions, etc.

With regard to the embodiment shown in FIGS. 1–5, it may be said that in order to prevent slipping of the chain out of the slot guide, the same may be provided with cams, springs, resilient elements, rubber bars, rubber rings, etc. The slot guide may also be spring-loaded.

It will be understood that each of the elements described above, or two or more together, may also find a useful application in other types of tire-chain assemblies differing from the types described above.

While the invention has been illustrated and described as embodied in a tire-chain assembly, it is not intended to be limited to the details shown, since various modifications and structural changes may be made made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A tire-chain assembly for a vehicle-mounted wheel having an inner face and an outer face separated by a peripheral ground-engaging surface, said assembly comprising an outer holder on said outer face; an inner holder on said inner face; at least one traction chain extending back and forth between said holders over the ground engaging surface; tightening means connected to the inner holder and including a flexible substantially non-extensible element for tightening said chain on the groun engaging surface, said flexible element having one end for pulling by a user and another end; and means at least on said inner holder for securing said flexible element so as to arrest said tightening means and including first means mounting said other end of said flexible element for eliminating any longitudinal displacement of said other end relative to said first means when said flexible element is tightened, and second means fixedly located relative to said first means and operative for arresting said one end of said flexible element when the same is tightened.

2. An assembly as defined in claim 1, wherein said first means are adapted to permit angular displacement of said other end of the flexible element relative to said first means.

3. An assembly as defined in claim 1, wherein said flexible element is chain.

4. An assembly as defined in claim 1, wherein said flexible element is rope.

5. An assembly as defined in claim 1, wherein said securing means comprise an elongated housing fixedly mounted on said inner holder and having said first and second means.

6. An assembly as defined in claim 5, wherein said housing is provided with a throughgoing slot guide for pulling therethrough said one end of said flexible element.

7. An assembly as defined in claim 6, wherein said second means comprise at least two elements spaced from each other so as to define said slot guide therebetween, at least one of said elements is movable relative to another of said elements from one position when said flexible element is clamped in said slot guide and another position in which said flexible element is free to move within said slot guide relative to the housing.

8. An assembly as defined in claim 7, wherein said one element is provided with a toothing portion engaging said flexible element when said one element is in said one position and urging said flexible element against said other element to thereby clamp the same between said two elements.

9. An assembly as defined in claim 6, wherein said second means comprise a number of elements so spaced from one another defining said slot guide as to permit said flexible element to pass therethrough only when the flexible element is predeterminingly oriented relative to said slot guide.

10. An assembly as defined in claim 7, wherein said second means are movable relative to said slot guide, between said one and said other positions.

11. An assembly as defined in claim 9, wherein said flexible element has two different mutually transverse cross-sectional dimensions, said slot guide having width measured in direction transversely to the elongation of the housing and exceeding both of said different dimensions of said flexible element, and length measured in direction substantially along the elongation of said housing and being smaller than at least one of said different dimensions of said flexible element.

12. An assembly as defined in claim 5, wherein said first means include a support fixedly located relative to said housing and operative for mounting said other end of said flexible element for angular displacement thereof relative to said support.

13. An assembly as defined in claim 1, wherein said securing means are provided on the front holder.

14. An assembly as defined in claim 6; and further comprising means for preventing undesired slipping of the flexible element out of said slot guide, and including a plurality of members at least partially obstructing the slot guide to thereby substantially eliminating any slipping of the flexible element out of said slot guide.

15. An assembly as defined in claim 6 wherein said housing is provided with a member for gripping thereon a corresponding portion of said one traction chain.

16. An assembly as defined in claim 12, wherein said housing is provided with means for limiting angular displacement of said other portion of said flexible element.

17. An assembly as defined in claim 10, wherein said second means include an arm mounted on the housing and being pivotable between said one and other positions, said arm being provided with a projection operative to at least partially close said slot guide when said second means are in said one position.

18. An assembly as defined in claim 7, wherein said second means further include resilient means for urging said one element in said one position.

19. An assembly as defined in claim 1, wherein said flexible element is reinforced.

20. An assembly as defined in claim 10, wherein said second means include a crossbar pivotably mounted on said housing and having a throughgoing passage for receiving said flexible element therein, said housing including a clamping jaw portion spaced from said crossbar so as to define said slot guide therebetween.

21. A tire-chain assembly for a vehicle mounted wheel having an inner face and an outer face separated by a peripheral ground-engaging surface, said assembly comprising an outer holder on said outer face; an inner holder on said inner face; at least one traction chain extending back and forth between said holders over the ground engaging surface; tightening means connected to the inner holder for tightening said chain on the ground engaging surface; and first means for securing said tightening means on said inner holder, said means being located on said inner holder.

22. A tire-chain assembly as defined in claim 21; and further comprising second means said tightening means located on said outer holder.

* * * * *